United States Patent [19]

Kushida et al.

[11] Patent Number: 4,980,211

[45] Date of Patent: Dec. 25, 1990

[54] ARTICLE OF POLYETHYLENE TEREPHTHALATE RESIN

[75] Inventors: Hideo Kushida, Yachiyo; Takeshi Itakura, Tokyo, both of Japan

[73] Assignee: Yoshino Kogyosho Co., Ltd., Tokyo, Japan

[21] Appl. No.: 212,588

[22] Filed: Dec. 3, 1980

[51] Int. Cl.$^5$ .............................................. B29D 22/00
[52] U.S. Cl. .................................. 428/36.7; 428/36.91; 428/475.2; 428/475.8; 428/483; 426/127; 264/532
[58] Field of Search .................. 428/483, 475.2, 475.8, 428/483, 480, 35, 36.7, 35.4, 36.6, 36.91; 426/127; 264/515, 532; 425/133.1, 532

[56] References Cited

U.S. PATENT DOCUMENTS

| | | | |
|---|---|---|---|
| 3,595,740 | 7/1971 | Gerow | 161/254 |
| 3,686,069 | 8/1972 | Winkler et al. | 428/475.2 |
| 3,733,309 | 5/1973 | Wyeth et al. | 264/515 |
| 3,874,989 | 4/1975 | Stange et al. | 428/475.2 |
| 3,878,282 | 4/1975 | Bonis et al. | 428/474 |
| 4,261,473 | 4/1981 | Yamada et al. | 428/476.3 |

Primary Examiner—Edith Buffalow
Attorney, Agent, or Firm—Oliff & Berridge

[57] ABSTRACT

An article of polyethylene terephthalate resin, particularly a laminated wall structure of a bottle made by biaxial orientation blow molding from the resin. The laminated wall is made up of polyethylene terephthalate resin and a synthetic resin material having good gas barrier properties.

10 Claims, 2 Drawing Sheets

ARTICLE OF POLYETHYLENE TEREPHTHALATE RESIN

BACKGROUND OF THE INVENTION

The present invention relates to an article made mainly of polyethylene terephthalate resin, particularly to laminated wall structures of bottles made by biaxial orientation blow molding mainly from polyethylene terephthalate resin.

Products, particularly orientation blow molded bottles, made of polyethylene terephthalate (hereinafter referred to as PET) or PET copolymers are used in large quantities as containers for foods, cosmetics, detergents, etc. because of their outstanding properties in clarity, chemical resistance, gas barrier, rigidity, mechanical strength, and hygienic qualities.

Notwithstanding these superior characteristics, PET products are not necessarily free from drawbacks. For instance, it is hard to give orientation to the neck or bottom of an orientation blow molded bottle. In products of complex design it is impossible to give uniform orientation which is applied to films or it is impossible to heat set orientation completely.

These drawbacks are not inherent in PET per se and can be overcome relatively simply by heat treatment or design modification. However, PET suffers from an inherent, serious drawback in that the gas barrier properties against oxygen are not satisfactory.

This is the reason why PET has been considered to be inadequate for use as containers of juice, beer, etc. which are sensitive to oxygen. PET products having outstanding properties required for containers are limited in their use because of their insufficient gas barrier properties against oxygen.

Nevertheless, there has been a strong desire for PET containers which can be used for oxygen-sensitive contents. Such containers must have outstanding gas barrier properties, while keeping the above-mentioned properties desirable for containers.

SUMMARY OF THE INVENTION

This invention has been completed to meet the above-mentioned requirements, and the gas barrier properties have been improved by laminating the main layer of PET with a barrier layer of a synthetic resin which is superior in gas barrier properties.

According to this invention, the properties of PET are supplemented by lamination of a barrier layer.

It is an object of this invention to provide PET products having improved gas barrier properties against oxygen.

It is another object of this invention to provide laminated PET products having improved bond strength between laminated layers.

Other objects and advantages of this invention will become apparent from the following description taken in conjunction with the accompanying drawings.

DETAILED DESCRIPTION OF THE INVENTION

Figure 1:
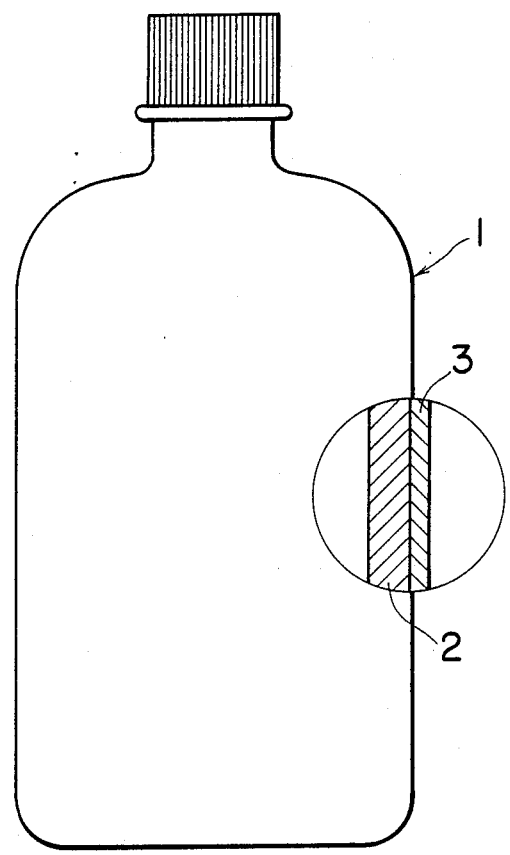
FIG. 1 is a partially enlarged longitudinal sectional view showing an embodiment of this invention.

The embodiments of this invention will be described in detail referring to the accompanying drawings.

The PET article 1 according to this invention is produced, as in ordinary PET products, by biaxial orientation blow molding, in which molding is accomplished directly, or molding is accomplished via blow molded parisons, injection molded parisons, or pipe-shaped parisons.

The article 1 according to this invention has such a wall structure that the main layer 2 of PET is laminated on its outside with the barrier layer 3 which is made of a synthetic resin such as acrylonitrile and its copolymers, polyamide and its copolymers, ethylene-vinyl alcohol copolymers, or polyvinylidene chloride which are superior in gas barrier properties.

The laminate wall structure consisting of the PET main layer 2 and the gas barrier layer 3 provides the article 1 with much improved barrier properties against oxygen. By virtue of these properties, the article of this invention can be used as a container for storing oxygen-sensitive contents over a long period of time.

Even though improved in the gas barrier properties, the article of this invention still requires almost the same wall thickness as the ordinary PET product having single layered walls. The wall thickness of plastics products, particularly plastics bottles, is selected according to applications of the products, and is determined by physical and chemical properties such as chemical resistance, gas barrier properties, distortion resistance under reduced pressure, pressure resistance, buckling strength, and drop strength. This means that the wall thickness cannot be reduced to one-tenth even though the gas barrier properties are improved ten times.

If the article of this invention is to be made in the same wall thickness as ordinary single-layered PET products, the thickness of the barrier layer 3 will be determined according to the following equation.

$$T_v = \frac{F}{(1/A - 1) - 1}$$

where $T_v$ is the ratio of the barrier layer 3 to the thickness of the wall thickness of the article 1; F is the desired gas barrier ratio of the required barrier to that of the container of PET alone, with PET being 1; and A is the relative gas permeability of the barrier layer 3, with PET being 1.

If it is desirable to obtain five times as high gas barrier properties as a PET single layer, by using polyamide resin, $T_v$ is obtained as follows according to the above equation.

$$T_v = \frac{5}{(1/0.03 - 1) + 1} = 0.150$$

This result indicates that the requirement is met if the wall thickness of the barrier layer 3 of polyamide resin is 15% and the wall thickness of the main layer 2 is 85%.

Since the article 1 according to this invention is made of PET and should have an accurate wall thickness, the biaxial orientation blow molding is accomplished most conveniently by the process in which the parison is prepared by injection molding or pipe molding.

As will be apparent from the construction illustrated, the exposed barrier layer 3 is liable to degradation by moisture (water) and scratching. In addition, the bond strength between the layers is not sufficient in all cases.

Figure 2:
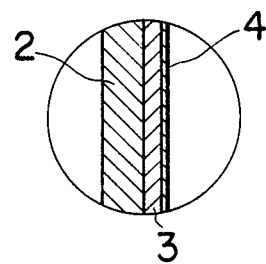
FIGS. 2-7 are partially enlarged longitudinal sectional views showing the laminated structure of the wall of various embodiments of this invention.

The degradation of the barrier layer 3 by moisture may be prevented by applying the moisture-proof coating 4, which is formed from a synthetic resin having a very low water-vapor permeability, to the entire surface of the barrier layer 3 as shown in FIG. 2.

The wall structure as shown in FIG. 2 can be made by applying the water-proof coating 4 by a proper means onto the surface of the wall as shown in FIG. 1. This water-proof coating 4 acts not only to protect the barrier layer 3 from moisture but to protect the barrier layer 3 from mechanical damage.

Figure 3:
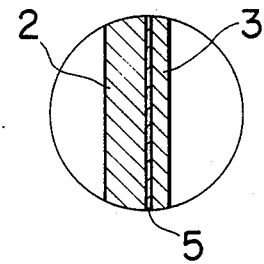

In the event that increased bond strength between the main layer 2 and the barrier layer 3 is particularly required (as in pressure resistant vessels), a special adhesive layer 5 may be placed between the main layer 2 and the barrier layer 3 as shown in FIG. 3.

Figure 4:
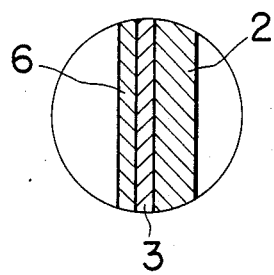

The embodiment as shown in FIG. 4 has an auxiliary layer 6 which is formed on and integral with the barrier layer 3, in place of the moisture-proof coating 4 as shown in FIG. 2. This auxiliary layer 6 is made of polyethylene or polypropylene which has a low water-vapor permeability and comparatively high surface hardness.

In the case of the embodiment as shown in FIG. 4, the main layer 2 and the barrier layer 3 may be made thin because the auxiliary layer 6 has comparatively high gas barrier properties and mechanical strength.

The embodiments as shown in FIGS. 2 to 4 have been devised to overcome those drawbacks encountered in the basic structure as shown in FIG. 1, but the choice of these embodiments depends on the requirements for the article 1.

Figure 5:
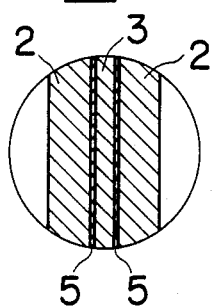
Figure 6:
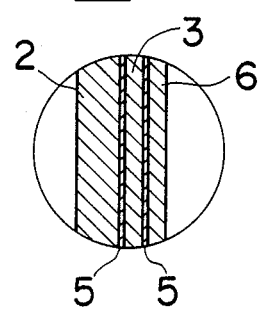

In the case of pressure bottles which should be free from all the drawbacks mentioned above, the wall structure having more layers as shown in FIGS. 5 and 6 is desirable.

In the embodiment as shown in FIG. 5, the laminated wall is made up of one barrier layer 3 and two main layers 2,2 bonded to both sides of the barrier layer 3 with adhesive layers 5,5.

In the embodiment as shown in FIG. 6, the laminated wall is made up of one each of the main layer 2, the barrier layer 3, and the auxiliary layer 6, which are bonded together with two adhesive layers 5,5.

In the embodiments as shown in FIGS. 5 and 6, layers are bonded together firmly with adhesive layers to increase the mechanical strength, and the barrier layer 3 is protected by the main layer 2 and auxiliary layer 6 from degradation by moisture.

The embodiments as shown in FIGS. 5 and 6 are compared as follows: In the embodiment of FIG. 5, both sides of the wall are the main layers 2 of PET, whereas in the embodiment of FIG. 6, one side of the wall is the main layer 2 of PET and the other side is an auxiliary layer 6 of polyethylene or polypropylene resin. Therefore, the embodiment of FIG. 5 is superior to that in FIG. 6 in clarity of wall, and hence of appearance. On the other hand, the embodiment of FIG. 6 is advantageous over the embodiment of FIG. 5 in gas and water vapor barrier properties owing to the auxiliary layer 6.

Figure 7:
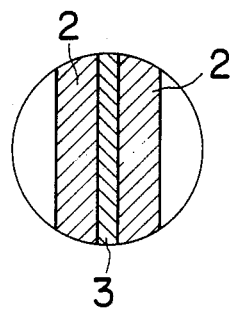

In the application areas such as non-carbonated beverage bottles where good clarity and appearance are required, the wall structure as shown in FIG. 7 may be acceptable, in which the adhesive layers 5,5 as used in the embodiment in FIG. 5 are removed.

When compared with the embodiment as shown in FIG. 5, the embodiment as shown in FIG. 7 is low in bond strength between layers and hence in mechanical strength of the laminate due to the absence of the adhesive layers 5,5, but is equal in performance and superior in clarity.

As will be apparent from the foregoing, the article 1 of this invention has extremely improved gas barrier properties against oxygen, and is expected to expand the application area of PET to a great extent. In addition, the containers according to this invention can take on various wall structures that meet specific requirements, and yet can be produced by the conventional molding technique.

What is claimed is:

1. A multilayer biaxially oriented synthetic resin bottle comprised of distinct layers produced by blow molding a parison comprised of a main layer of polyethylene terephthalate rein and a barrier layer of a synthetic resin material which is substantially impermeable to oxygen, said barrier layer having a thickness $t_3$ and being laminated to the outside of said main layer, a ratio of said barrier layer thickness $t_3$ to a thickness of the entire wall being approximately equal to $T_v$, calculated according to the equation:

$$T_v = \frac{F}{(1/A - 1) + 1},$$

where F is a ratio of the gas barrier ratio of the entire wall to that of a similarly-dimensioned wall of polyethylene terephthalate along; and A is a gas permeability of said barrier layer divided by that of polyethylene terephthalate.

2. A multilayer biaxially oriented polyethylene terephthalate resin bottle as recited in claim 1, further comprising an auxiliary layer of a polyolefin resin having high water resistance and extremely low water vapor permeability, said barrier layer being sandwiched between said main layer and said auxiliary layer.

3. A multilayer biaxially oriented polyethylene terephthalate resin bottle as recited in claim 1, further comprising a second main layer of polyethylene terephthalate resin and two adhesive layers, said barrier layer being positioned between said main layers with one of said two adhesive layers on each side of said barrier layer.

4. A multilayer biaxially oriented polyethylene terephthalate resin bottle as recited in claim 1, further comprising an auxiliary layer and two adhesive layers, said barrier layer being positioned between said main layer and said auxiliary layer wiht one of said two adhesive layers on each side of said barrier layer.

5. A multilayer biaxially oriented polyethylene terephthalate resin bottle as recited in claim 1, further comprising an auxiliary layer sandwiched between said main layer and said auxiliary layer.

6. A bottle in accordance with claim 2, wherein said polyolefin resin is polyethylene or polypropylene resin.

7. A bottle in accordance with claim 5, wherein the synthetic resin of said barrier layer is an acrylonitrile resin, ethylene-vinyl alcohol copolymer resin, or polyvinylidene chloride resin.

8. A bottle in accordance with claim 7, wherein said auxiliary layer is polyethylene or polypropylene.

9. A multilayer biaxially oriented bottle as claimed in claim 1, wherein said barrier layer comprises a single synthetic resin.

10. A multilayer biaxially oriented bottle as claimed in claim 1, further comprising a moisture-proof coating of a synthetic resin material having extremely low water vapor permeability coated over the entire outside of said barrier layer.

* * * * *